(12) United States Patent
Ijtsma et al.

(10) Patent No.: US 7,898,913 B2
(45) Date of Patent: Mar. 1, 2011

(54) DEVICE FOR AND METHOD OF RECORDING INFORMATION ON WRITE-ONCE RECORD CARRIER

(75) Inventors: Pope Ijtsma, Eindhoven (NL);
Johannes Jan Mons, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1066 days.

(21) Appl. No.: 11/571,529

(22) PCT Filed: Jul. 22, 2005

(86) PCT No.: PCT/IB2005/052046
§ 371 (c)(1),
(2), (4) Date: Jan. 2, 2007

(87) PCT Pub. No.: WO2006/006086
PCT Pub. Date: Jan. 19, 2006

(65) Prior Publication Data
US 2008/0025192 A1    Jan. 31, 2008

(30) Foreign Application Priority Data
Jul. 5, 2004  (EP) ..................................... 04103179

(51) Int. Cl.
*G11B 7/00*    (2006.01)
(52) U.S. Cl. ................ 369/47.13; 369/275.3; 369/53.24; 369/59.25

(58) Field of Classification Search ........................ None
See application file for complete search history.

(56) References Cited

U.S. PATENT DOCUMENTS

| 2001/0013269 A1 | 8/2001 | Tanji | |
|---|---|---|---|
| 2002/0161774 A1* | 10/2002 | Tol et al. | ........................ 707/100 |
| 2008/0232210 A1* | 9/2008 | Buban et al. | ............... 369/47.13 |

FOREIGN PATENT DOCUMENTS

| EP | 1160786 A2 | 12/2001 |
|---|---|---|
| JP | 63146287 | 6/1988 |
| JP | 06338139 | 12/1994 |
| JP | 11353777 | 12/1999 |

OTHER PUBLICATIONS

ISR/Written Opinion of the International Searching Authority PCT/IB2005/052046.

* cited by examiner

*Primary Examiner* — Jorge L Ortiz Criado

(57) ABSTRACT

A device for recording blocks of information on logical addresses on a write once record carrier at corresponding physical addresses. The logical addresses are translated into the physical addresses by addressing means (31). Allocation means (32) define a continuous addressing space for a user area and divide it into a front area, a middle area and a rear area for sequentially recording information by allocating to them parts of the user area address range. The device has re-allocation means (33) for splitting the middle area into new areas, specifically when no more data can be stored in the rear area or the front area.

19 Claims, 3 Drawing Sheets

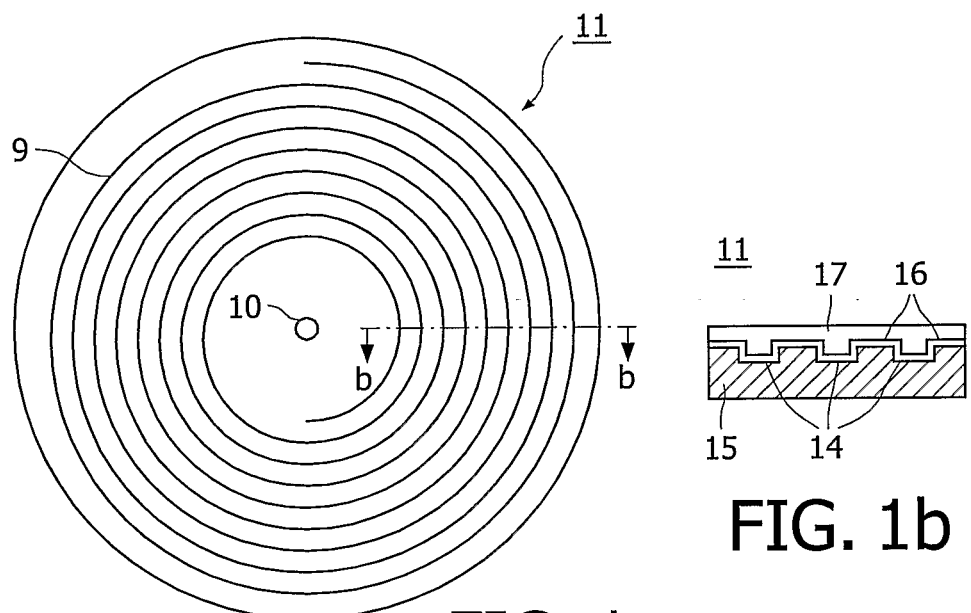
FIG. 1b
FIG. 1a
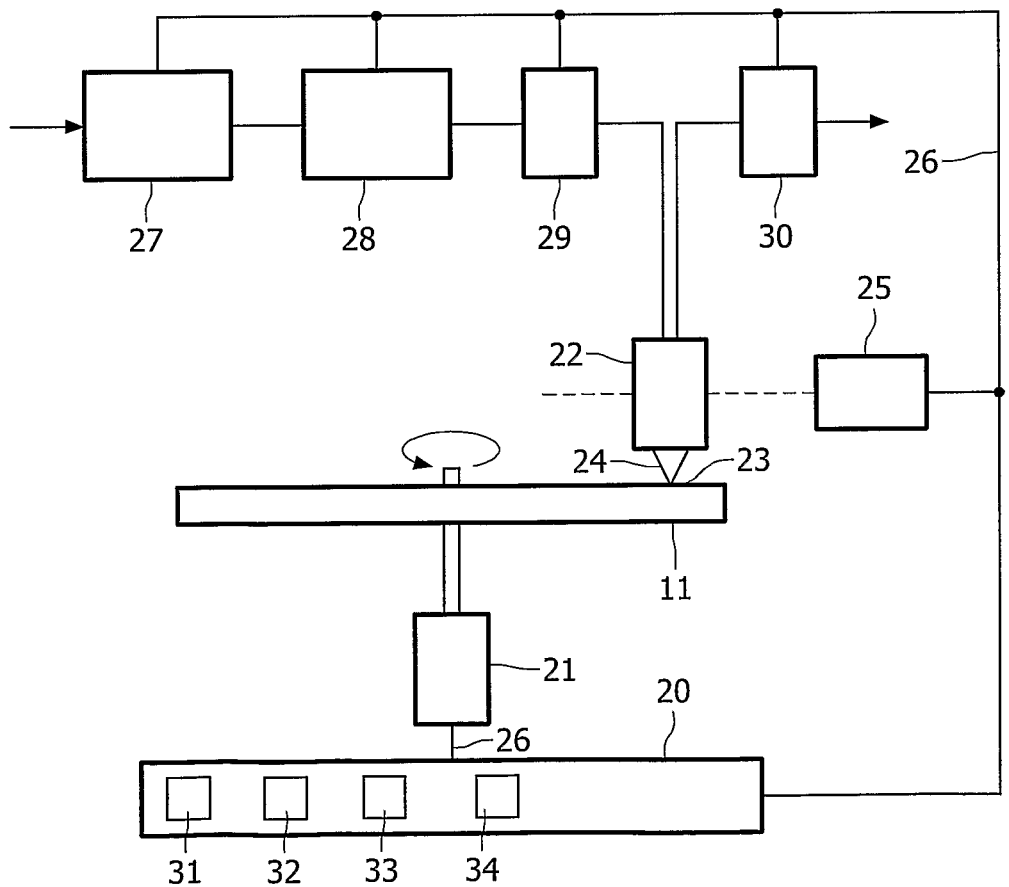
FIG. 2

DEVICE FOR AND METHOD OF RECORDING INFORMATION ON WRITE-ONCE RECORD CARRIER

The invention relates to a device for recording information organized in blocks at locations having physical addresses on a write-once record carrier, said locations having logical addresses in a user area, which device comprises recording means for recording marks in a track on the record carrier representing the information.

The invention further relates to a method of allocating space for storing data for use in recording information organized in blocks at locations having physical addresses on a write-once record carrier, said locations having logical addresses in a user area.

The invention further relates to a computer program product for allocating space for storing data for use in recording information.

To enable Drag and Drop technique of adding data, sometimes also called drive letter access DLA, on write once media the UDF file system uses a method called Virtual Allocation Table VAT. This method fills the disc from the inside to outside, in a sequential way, with data and file system information. The last written information before the disc is ejected or dismounted is the VAT table, this table contains the last updated references to the file system information blocks and data files. In the latest UDF version a new concept was introduced to enhance quick startup and robustness. This concept is called metadata, this is a special file at the inner side (start) of the disc and contains all the file entries. These file entries contain the references to the real file data By packing them close together the disc file tree information can be read very quickly after a mount of the media. This file is of course an important file and can be guarded by a backup file called the metadata mirror file. It is obvious this file has to be placed at sufficient physical distance on the media in case of damages. The best place for the mirror backup file is on the outside of the media.

For Blu-ray write-once discs, BD R, a new file system write method is proposed without using the VAT method. This new method makes use of defect management and of pseudo overwrites. When a write command is issued to an already written sector then the sector is either replaced by a sector in the spare area (linear replacement) or written at the next writeable sector in that specific sub-track, in a user area.

The metadata file is placed at the start (inner side) of the media and for that purpose a sub-track is reserved (sub-track 1) which has some free area to add new files. The remaining part mostly called the invisible sub-track is used for the data, like the movie file itself. A reserved sub-track at the outside can be reserved to contain the metadata mirror file. This is done during initialization of the disc when the user area is defined and divided into a front area (sub-track 1) for storing the metadata file, a middle area (sub-track 2) for storing real file data and a rear area (sub-track 3 in this example) for storing the mirror metadata file.

There is a problem when during usage of the disc the metadata area (sub-track 1) becomes full or is to small to keep all the file entries. This is even more noticeable in case of the mirror metadata area (sub-track 3) as this area is defined at the end of the user area intended for sequential recording of data on the write-once medium.

Therefore, it is an object of the invention to overcome this problem, and, more generally, to provide a more flexible way of storing data on such medium.

This object is achieved, according to a first aspect of the invention, by a device of the type described in the opening paragraph, comprising control means for controlling the recording by locating each location at a physical address in the track, the control means comprising addressing means for translating the logical addresses into the physical addresses and vice versa;

allocation means for defining an ordered user area address range of the logical addresses for the user area, and for dividing the user area into a front area, a middle area and a rear area for sequentially recording information, by allocating to each of said areas a corresponding address range part of the user area address range, all address range parts being adjacent and separate; and re-allocation means for replacing the middle area by new areas, by allocating to each of said new areas a corresponding new address range part of the middle area address range part, one new address range part including addresses of all locations with recorded data within the middle area and all new address range parts being adjacent and separate. This allows for re-allocation of the user area in dependence on storage needs for recording specific information, like the mirror metadata file.

In an embodiment of the device, the re-allocation means are arranged for checking if there is at least one free address for recording information in an area out of the front area and the rear area, and for performing said replacing in case of negative result of said checking. This makes the re-allocation a dynamic process—the changes can be applied "on-fly".

In another embodiment of the device, the control means are arranged for storing areas information as a table on the record carrier, said areas information related to the front area, the middle area, the rear area and the new areas. This improves handling of the record carrier between different devices or after re-insertion to the same device.

It is advantageous, if said areas information comprises for each of the front area, the middle area, the rear area and the new areas a corresponding start address. This provides a simple way of identifying ranges within the user area.

In a next embodiment of the device, said areas information comprises for each of the front area, the middle area, the rear area and the new areas a corresponding range number. This makes it possible to explicitly assign a given range to a specific sub-track.

According to a second aspect of the invention a method of allocating space for storing data for use in recording information of the type described in the opening paragraph is provided, which recording comprises locating each location at a physical address in a track on the record carrier;

translating the logical addresses into physical addresses and vice versa, the method comprising defining an ordered user area address range of the logical addresses for the user area;

dividing the user area into a front area, a middle area and a rear area for sequentially recording information, by allocating to each of said areas a corresponding address range part of the user area address range, all address range parts being adjacent and separate; and replacing the middle area by new areas, by allocating to each of said new areas a corresponding new address range part of the middle area address range part, one new address range part including addresses of all locations with recorded data within the middle area and all new address range parts being adjacent and separate.

According to a third aspect of the invention a computer program product allocating space for storing data for use in recording information is provided, which program is operative to cause a processor to perform the method as described in relation to the second aspect of the invention.

These and other aspects of the invention will be apparent from and elucidated further with reference to the embodiments described by way of example in the following description and with reference to the accompanying drawings, in which:

FIG. 1a shows a recording medium (top view),

FIG. 1b shows a recording medium (cross section),

FIG. 2 shows a recording device, in accordance with the invention,

Corresponding elements in different Figures have identical reference numerals.

Figure 3A:
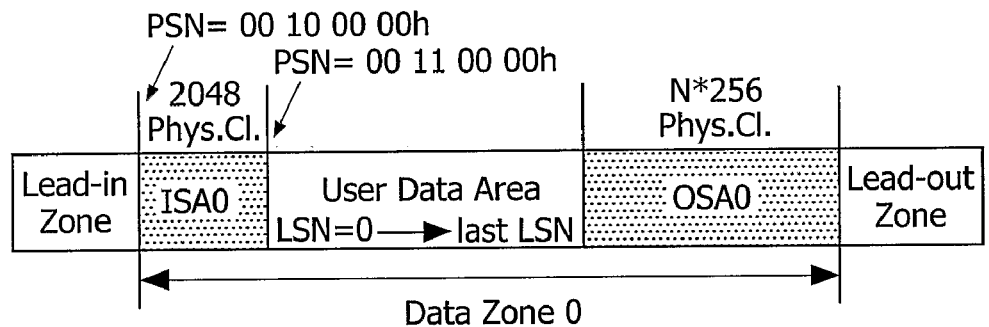
FIG. 3 shows two examples of addressing within the user area.

FIG. 1a shows an example of a recording medium 11 having a form of disc with a track 9 and a central hole 10. The track 9, being the position of the series of (to be) recorded marks representing information (data), is arranged in accordance with a spiral pattern of turns constituting substantially parallel tracks on an information layer. The recording medium may be optically readable, called an optical disc, and has an information layer of a recordable type. Examples of a recordable disc are the CD-RW, and writable versions of DVD, such as DVD+RW, and the high density writable optical disc using blue lasers, called Blu-ray Disc (BD). The information is represented on the information layer by recording optically detectable marks along the track, e.g. crystalline or amorphous marks in phase change material. The track 9 on the recordable type of recording medium is indicated by a pre-embossed track structure provided during manufacture of the blank recording medium. The track structure is constituted, for example, by a pregroove 14, which enables a read/write head to follow the track during scanning. The track structure comprises position information, e.g. addresses, for indication the location of units of information, usually called information blocks or packets.

FIG. 1b is a cross-section taken along the line b-b of the recording medium 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

FIG. 2 shows a recording device for recording information on a recording medium 11 such as CD-RW, DVD+RW or BD, in accordance with the invention. The apparatus is provided with writing means for scanning the track on the recording medium, which means include a drive unit 21 for rotating the recording medium 11, a head 22, and a positioning unit 25 for coarsely positioning the head 22 in the radial direction on the track. The head 22 comprises an optical system of a known type for generating a radiation beam 24 guided through optical elements focused to a radiation spot 23 on a track of the information layer of the recording medium. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. For reading, the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve information (data). Hence retrieving means for reading information include the drive unit 21, the head 22, the positioning unit 25 and the read processing unit 30. The device comprises write processing means for processing the input information to generate a write signal to drive the head 22, which means comprise an (optional) input unit 27, and modulator means comprising a formatter 28 and a modulator 29. During the writing operation, marks representing the information are formed on the record carrier. The marks are formed by means of the spot 23 generated on the recording layer via the beam 24 of electromagnetic radiation, usually from a laser diode. Digital data is stored on the record carrier according to a predefined data format. Writing and reading of information on/from optical disks and formatting, error correcting and channel coding rules are well-known in the art, e.g. from the CD and DVD system. The input unit 27 processes input data to units of information, which are passed to the formatter 28 for adding control data and formatting the data, e.g. by adding error correction codes (ECC) and/or interleaving. For computer applications units of information may be interfaced to the formatter 28 directly—in such case, as an option, the input unit 27 does not have to be present in the apparatus. The formatted data from the output of the formatter 28 is passed to the modulation unit 29, which comprises for example a channel coder, for generating a modulated signal, which drives the head 22. Further the modulation unit 29 comprises synchronizing means for including synchronizing patterns in the modulated signal. The formatted units presented to the input of the modulation unit 29 comprise address information and are written to corresponding addressable locations on the recording medium under the control of a control unit 20. The control unit 20, which controls the recording and retrieving of information, may be arranged for receiving commands from a user or from a host computer. The control unit 20 is connected via control lines 26, e.g. a system bus, to said input unit 27, formatter 28 and modulator 29, to the read processing unit 30, to the drive unit 21, and to the positioning unit 25. The control unit 20 comprises control circuitry, for example a microprocessor, a program memory and control gates, for performing the procedures and functions according to the invention as described below. The control unit 20 may also be implemented as a state machine in logic circuits.

In an embodiment the device is a storage system only, e.g. an optical disc drive for use in a computer. The control unit 20 is arranged to communicate with a processing unit in the host computer via a standardized interface (not shown). Digital data is interfaced to the formatter 28 and from the read processing unit 30 directly. In this case, the interface acts as an input unit and an output unit; as an option, the input unit 27 does not have to be present in the device.

In an embodiment the device is arranged as a stand alone unit, for example a video recording apparatus for consumer use. The control unit 20, or an additional host control unit included in the device, is arranged to be controlled directly by the user, and to perform the functions of the file system(s). The device includes application data processing, e.g. audio and/or video processing circuits. User information is presented on the input unit 27, which may comprise compression means for input signals such as analog audio and/or video, or digital uncompressed audio/video. The read processing unit 30 may comprise suitable audio and/or video decoding units.

A read device has the same elements as the recording device, except the specific recording elements, e.g. the read device does not have the input unit 27, the formatter 28, the modulator 29, an allocation unit 32 and a re-allocation unit 33.

The control unit 20 is arranged for controlling the recording by locating each block at a physical address in the track. The control unit 20 includes the following cooperating units: the addressing unit 31, the allocation unit 32, and the re-allocation unit 33, which units are for example implemented in firmware.

The addressing unit 31 is for translating physical addresses into logical addresses and vice versa. The logical addresses constitute a contiguous storage space, a user area, to be used for storing sequences of information blocks, such as files under control of a file management system, for example UDF.

Figure 3B:
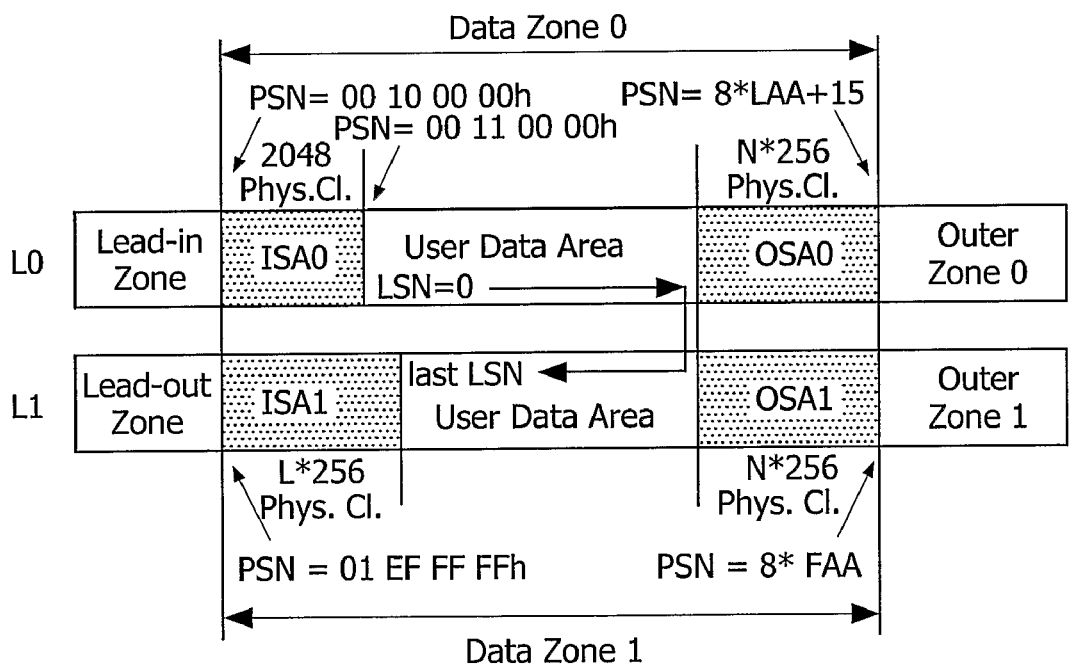
Figure 4:
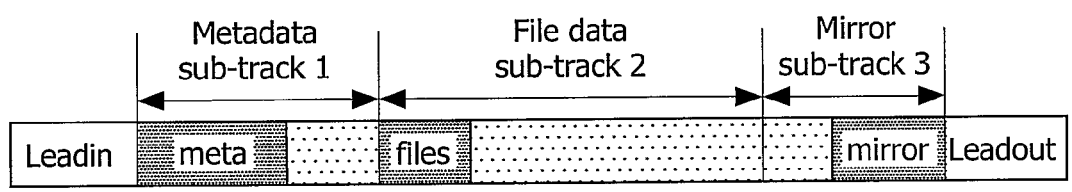
FIG. 4 shows an example of dividing the user area into sub-tracks.

The allocation unit 32 is for defining an ordered user area address range of the logical addresses for the user area. Examples of user (data) area addressing are shown in FIG. 3. Logical addresses within the user are indicated as logical sector numbers LSN; physical addresses on the record carrier are indicated as physical sector numbers PSN. ISA and OSA indicate inner and outer spare areas for defect management. FIG. 3a shows a single layer medium, whereas FIG. 3b shows a double layer medium with layers indicated by L0 and L1. Further the allocation unit 32 is for dividing the user area into a front area, a middle area and a rear area for sequentially recording information, by allocating to each of said areas a corresponding address range part of the user area address range. All address range parts are adjacent and separate. This is illustrated in FIG. 4, where sub-tracks 1 to 3 correspond to the front area, the middle area and the rear area, respectively.

The re-allocation unit 33 is for replacing the middle area by new areas. This is done by allocating to each of said new areas a corresponding new address range part of the middle area address range part. One of these new address range parts includes addresses of all locations with recorded data within the middle area. All new address range parts are adjacent and separate. So, effectively, the middle are is split into new areas. This process of splitting can be performed several times, i.e. the re-allocation unit 33 is capable of splitting any new area into further areas. Functionality of the re-allocation unit 33 is described below in more details with reference to FIG. 5.

In an embodiment, the re-allocation unit 33 is arranged for checking if there is at least one free address for recording information in the rear area. If there is no free space for recording data in the rear area, the middle area is split into the new areas, so at least one of these new areas can be used for recording said data. Of course, this can be done only when there are still empty locations for recording data within the middle area. During usage of the record carrier, any new area can become full. At this moment the re-allocation unit 33 can split some other new area using the mechanism described above and allocate a part of that other area for recording data, which do not fit anymore in said area.

Alternatively, or in addition, the re-allocation unit 33 is arranged for checking if there is at least one free address for recording information in the front area and for allocating new areas in case of positive result of this verification.

In a practical embodiment, the allocation unit 32 is arranged for defining the middle area for storing main data, such as files under control of a file management system. The front area is allocated for storing control data related to the main data. In an embodiment, the control data comprise the metadata file containing file entries with address references to the main data.

In another practical embodiment, the allocation unit 32 is arranged for defining the rear area for storing a copy of the control data. For example, a backup of the metadata file, the mirror metadata file, can be stored in the rear area.

Advantageously, the control unit 20 is adapted to record information related to areas allocated in the user area on the record carrier. For example a table containing start addresses (beginning of ranges) of those areas can be stored on the record carrier. In another embodiment, the control unit 20 is capable of storing also end addresses (ends of ranges) in said table. Start/end addresses can be represented by logical or physical addresses.

Areas allocated in the user area can be referred to as sub-tracks. Each sub-track may have a number corresponding to it. This number can be determined by a position of the data related to a particular sub-track in the table. For example, a start address of a range in the third row in the table, corresponds to the sub-track number 3. Alternatively, the control unit 20 is capable of storing a sub-track number corresponding to a particular address range, in the table. For example, this allows for non-linear sub-track numbering independent on the order of sub-track related data in the table.

Figure 5:
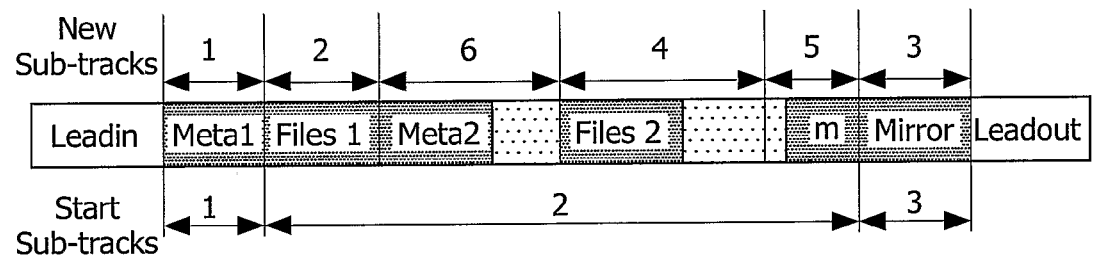
FIG. 5 shows an example of splitting the middle area, in accordance with the invention.

FIG. 5 illustrates a concept of splitting the middle area into new areas. Of course, as indicated above, this concept can be applied several times, to any new area comprising empty locations for recording information. At the beginning the user area is divided into three areas (the front area, the middle area and the rear area) indicated as sub-tracks 1 to 3, respectively. Sub-track 1 is for recording the metadata file Meta 1, sub-track 2 is for recording user files and sub-track 3 is for recording the copy of the metadata file, the mirror metadata file. During usage of the record carrier, first the mirror metadata file sub-track 3 overflows. At this point, sub-track 2 is replaced/split by/into new sub-tracks. The new sub-track containing the recorded data Files 1 is numbered as sub-track 2. A new sub-track 5 is created for recording new data of the mirror metadata file. The remaining part of the old sub-track 2 is numbered as sub-track 4. The re-allocation procedure is applied again when (in this example) sub-track 1 overflows; sub-track 4 is split into two new sub-tracks. One of them retains number 4 and comprises user files Files 2. This new sub-track 4 is for recording further user files. A new sub-track 6 is created for recording new data of the metadata file. FIG. 5 shows the organization of the user area after the original middle area sub-track 2 is split twice. The numbering of sub-tracks can be different.

It is noted that the function of the re-allocation unit 33 can be performed as a process of allocating space for storing data in a separate device, for example as a computer program in a host computer controlling a disc drive. The drive accommodates physically recording and retrieving of information in blocks having logical addresses on the record carrier by locating each block at a physical address in the track, translating the logical addresses into the physical addresses and vice versa.

An embodiment of a computer program product according to the invention is operative to cause the control unit 20 or a processor in a computer to perform methods and functions as described in reference to embodiments of the recording device presented above.

Whilst the invention has been described with reference to preferred embodiments thereof, it is to be understood that these are not limitative examples. Thus, various modifications may become apparent to those skilled in the art, without departing from the scope of the invention, as defined by the claims and the embodiments. Further, the invention lies in each and every novel feature or combination of features described above. Also, for the storage medium an optical disc has been described, but other media, such as a magneto-optical disc or magnetic tape, can be used. It is noted, that the invention may be implemented by means of a general purpose processor executing a computer program or by dedicated hardware or by a combination of both, and that in this document the word "comprising" does not exclude the presence of other elements or steps than those listed and the word "a" or "an" preceding an element does not exclude the presence of a plurality of such elements, that any reference signs do not limit the scope of the claims, that "means" may be represented by a single item or a plurality and that several "means" may be represented by the same item of hardware.

The invention claimed is:

1. A device for recording information organized in blocks at locations having physical addresses on a write-once record carrier, said locations having logical addresses in a user area, which device comprises
 recording means for recording marks in a track on the record carrier representing the information, and
 control means for controlling the recording by locating each location at a physical address in the track, the control means comprising
 addressing means for translating the logical addresses into the physical addresses and vice versa;
 allocation means for defining an ordered user area address range of the logical addresses for the user area, and for dividing the user area into a front area, a middle area and a rear area for sequentially recording information, by allocating to each of said areas a corresponding address range part of the user area address range, all address range parts being adjacent and separate; and
 re-allocation means for replacing the middle area by new areas, by allocating to each of said new areas a corresponding new address range part of the middle area address range part, one new address range part including addresses of all locations with recorded data within the middle area and all new address range parts being adjacent and separate.

2. A device as claimed in claim 1, wherein the re-allocation means are arranged for checking if there is at least one free address for recording information in an area out of the front area and the rear area, and for performing said replacing in case of negative result of said checking.

3. A device as claimed in claim 1, wherein the allocation means are arranged for defining the middle area for storing main data and the front area is storing control data related to the main data.

4. A device as claimed in claim 3, wherein the control data comprise file entries with address references pointing to the main data.

5. A device as claimed in claim 3, wherein the rear area is for storing a copy of the control data.

6. A device as claimed in claim 1, wherein the control means are arranged for storing areas information as a table on the record carrier, said areas information related to the front area, the middle area, the rear area and the new areas.

7. A device as claimed in claim 6, wherein said areas information comprises for each of the front area, the middle area, the rear area and the new areas a corresponding start address.

8. A device as claimed in claim 7, wherein said areas information comprises for each of the front area, the middle area, the rear area and the new areas a corresponding end address.

9. A device as claimed in claim 7, wherein said areas information comprises for each of the front area, the middle area, the rear area and the new areas a corresponding range number.

10. A method of allocating space for storing data for use in recording information organized in blocks at locations having physical addresses on a write-once record carrier, said locations having logical addresses in a user area, which recording comprises
 locating each location at a physical address in a track on the record carrier;
 translating the logical addresses into physical addresses and vice versa,
the method comprising
 defining an ordered user area address range of the logical addresses for the user area;
 dividing the user area into a front area, a middle area and a rear area for sequentially recording information, by allocating to each of said areas a corresponding address range part of the user area address range, all address range parts being adjacent and separate; and
 replacing the middle area by new areas, by allocating to each of said new areas a corresponding new address range part of the middle area address range part, one new address range part including addresses of all locations with recorded data within the middle area and all new address range parts being adjacent and separate.

11. A method as claimed in claim 10, comprising checking if there is at least one free address for recording information in an area out of the front area and the rear area, said replacing being performed in case of negative result of said checking.

12. A method as claimed in claim 10, wherein the middle area is for storing main data and the front area is for storing control data related to the main data.

13. A method as claimed in claim 12, wherein the control data comprise file entries with address references pointing to the main data.

14. A method as claimed in claim 12, wherein the rear area is for storing a copy of the control data.

15. A method as claimed in claim 10, comprising storing areas information as a table on the record carrier, said areas information related to the three adjacent separate areas and the new adjacent separate areas.

16. A method as claimed in claim 15, wherein said areas information comprises for each of the front area, the middle area, the rear area and the new areas a corresponding start address.

17. A method as claimed in claim 16, wherein said areas information comprises for each of the front area, the middle area, the rear area and the new areas a corresponding end address.

18. A method as claimed in claim 16, wherein said areas information comprises for each of the front area, the middle area, the rear area and the new areas a corresponding range number.

19. A non-transitory computer readable physical media containing physical instructions in the form of encoded variations of physical properties of the media for controlling a computer processor to cause the processor to perform the method for allocating space for storing data for use in recording information as claimed in claim 10.

* * * * *